Aug. 31, 1954

N. O. CLARK 2,688,065

ELECTRIC WELDER

Filed Sept. 11, 1951

INVENTOR.
NELSON O. CLARK
BY
Paul M. Klein
ATTORNEY

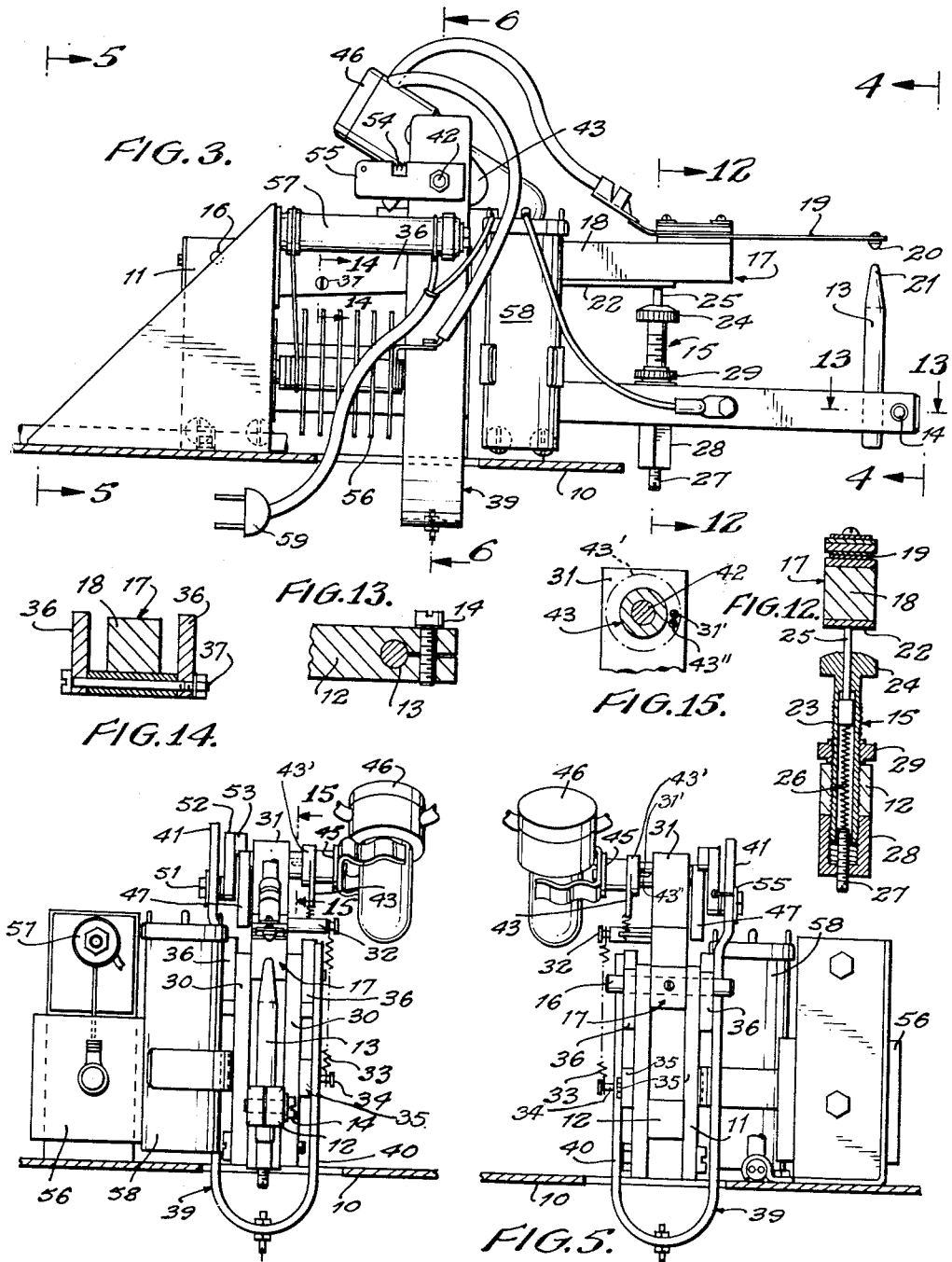

Aug. 31, 1954

N. O. CLARK 2,688,065

ELECTRIC WELDER

Filed Sept. 11, 1951

INVENTOR.
NELSON O. CLARK
BY Paul Klein
ATTORNEY

Aug. 31, 1954

N. O. CLARK 2,688,065

ELECTRIC WELDER

Filed Sept. 11, 1951

INVENTOR.
NELSON O. CLARK
BY
ATTORNEY

Patented Aug. 31, 1954

2,688,065

UNITED STATES PATENT OFFICE 2,688,065

ELECTRIC WELDER

Nelson O. Clark, Winthrop, Mass.

Application September 11, 1951, Serial No. 246,099

6 Claims. (Cl. 219—4)

This invention relates generally to electric welding devices and particularly to welders for effecting uniform welds on relatively small-dimensional articles manufactured on a quantity production basis.

Electric welding devices are well-known in the art but usually are not intended for producing exactly uniform welds. As a matter of fact, with most of such devices welding uniformity is nigh impossible of achievement due mostly to the ever changing difference in impact intensity between the contacting electrodes which are usually of cumbersome construction and are affected by friction, stiffness of conductors or other obstacles during their movement toward or from one another.

The present invention contemplates a welder construction wherein stationary and mobile electrodes are employed, and wherein the operation of the mobile electrode is unimpaired by either the operating mechanism for moving it or by any other causes which would impede the movement of the mobile electrode. In order to produce consistently uniform welds, especially when welding relatively small articles, or even larger articles of similar or different materials, the prime requirement seems to be the uniformity of interengagement between the electrodes, the uniformity of impact upon the work to be welded and the correct timing of the passage of the welding current through the electrode at the moment the weld is to be effected.

Obviously it must be assumed that the areas of the articles to be welded are clean, and when mass production is to be effected, the shape, size and thickness of the articles to be welded must be consistently uniform in order to produce substantially identical welds with a given set-up and adjustment of the welder.

Added to the aforesaid requirements the temperature necessary for effecting uniform welds of such articles must also be consistently uniform. Any heat losses which may occur during each welding operation preferably should form but a very small part of the total welding heat required, and such losses should also be held as constant as possible. To achieve the correct welding heat required, the contact resistance at the point of the weld should be consistently uniform. There exists a definite relation between the required welding heat and the heat losses during the welding operation. Such heat losses are due to many causes, for instance, the heat dissipation over the surfaces to be welded, heat losses due to conduction and radiation and also due to convection.

All of the heat losses are in direct proportion to the time required for effecting a weld. Therefore the shorter the welding period, the smaller will be the heat losses. Consequently the closer the welding period approaches zero time, the lesser will be the heat losses.

Difficulty is particularly encountered in welding small parts to larger parts, and the above axiom of shortening the welding period becomes especially applicable, since when the weld is attempted slowly, the larger part will dissipate the heat and may never reach the welding temperature, while the small part may melt. It is essential therefore to deliver relatively intense heat during as short a time as possible, which is effected by passing a current of high intensity through the point of weld in as short a time as possible. In heretofore used welding devices known as condenser welders, inductances or step-down transformers were employed in the discharge circuit. They slow down the time of discharge and therefore increase the time of the welding period. The present invention contemplates the elimination of transformers from the discharge circuit for condenser welders. Furthermore, the present invention contemplates a condenser discharge circuit of as little interior resistance as possible so that the resistance of the circuit forms but a small percentage of the contact resistance at the point of the weld.

When it becomes necessary to weld small parts to larger parts it is desirable to slow down the welding time somewhat in order to allow the larger part to reach welding temperature by conduction and by a slight swaging action. To meet such contingency the present invention contemplates the employment in the condenser discharge circuit of a plurality of condensers, of which at least one condenser may be charged at a comparatively high voltage, whereupon the high voltage charge is transferred to a condenser of a larger capacity prior to passing the charge through the welding electrodes.

In mass production the time element is of utmost consideration. The time required to charge a condenser limits the rate of producing welds. The present invention contemplates overcoming that difficulty by the employment in the condenser discharge circuit of a plurality of condensers so that while one of the condensers is being charged, another condenser is being discharged through the electrode termini.

In order to enhance the work capacity of welders it is essential to render them adjustable for different types of work to be handled by the welder. It is necessary therefore when smaller or larger articles are to be welded, to correspondingly regulate the current intensity which is to pass through the weld. For that reason the present invention contemplates the provision of an adjustable power supply, fed from a constant source of energy for delivery into the discharge circuit of the required direct current voltage to the condenser. Assuming that a welder receives power from an alternating current line, its voltage may be regulated by a variable transformer or potentiometer from which the current adjusted to the required voltage is passed through a limiting choke and a half-wave rectifier. With the thus produced direct current the condenser is charged. Obviously the conversion from A. C. to D. C. voltage may be achieved by other means than a half-wave rectifier, such as electronic or other rectifying device well known in the art.

The heat developed at the point of the weld is a function of contact resistance and varies with the physical and other properties of the material to be welded and with the properties of the electrodes, as well as with the pressure exerted by the electrodes against the work piece and furthermore with the shape and size of the work piece. Therefore in order to obtain consecutive uniformity in welds of like articles, it is essential that the contact resistance be maintained uniformly. In heretofore used welding devices very little attention was paid to the amount of pressure developed between the electrodes during welding operations. That pressure, as stated, may greatly vary due to friction losses and other factors, such as temperature changes, lubrication, etc. As a result, welders wherein pressure between electrodes varies are limited to welding relatively large work pieces. When small parts are to be welded, variations in pressure between the electrodes would preclude uniformity in welds unsuitable for quantity welding production.

The present invention contemplates to overcome the faults of heretofore welders, especially as to the variability of pressure during welding operations by the provision of means for controlling the movement of and the impact by the mobile electrode in respect to the stationary electrode and by the employment of other means for effecting uniform pressure between the electrodes, both of which control means are designed to render the mobile electrode independent of any frictional influences or other impedances in its operation.

As stated, an essential feature in a welder to produce uniform welds, is the timing of the passage of current through the electrodes. The present invention contemplates provisions for exactly timing the passage of current through the electrodes at the very instant the electrodes contact, the current being discontinued prior to the separation of the electrodes.

The principal objects of this invention therefore are the provision of an electric welder in which is employed a transformerless discharge circuit and in which discharge circuit are included regulating means for adjusting the current voltage, a resistance element and a half-wave rectifier in conjunction with at least one or a plurality of condensers chargeable by the current flowing from the rectifier, and wherein means are provided for exactly timing the passage of a discharge from the condenser through the welding termini of the electrodes at the time of their contact with one another, and the stoppage of the current prior to the separation of the electrodes, and wherein means are provided for effecting uniform contact pressure between the electrodes to effect uniformity in welds of relatively uniform parts to be welded.

A further object of this invention is the provision in the above transformerless discharge circuit of a welder, of a plurality of condensers wherein one of the condensers is chargeable with a relatively high voltage and from which condenser the charge is transferred to a condenser of a much larger capacity prior to passing the charge through the electrodes.

Another object of this invention is the provision in a welder of a transformerless discharge circuit wherein are employed several condensers, and wherein means are provided, such as auxiliary switch means, for transferring the charge from one condenser to another condenser prior to delivering the transferred charge through the contacting termini of the electrodes.

A still further object of this invention is the provision in a discharge circuit of an electric welder, of a plurality of condensers and suitable auxiliary switch means to permit the charging of one condenser while the charge of the other condenser is being discharged through the electrodes.

The foregoing and still other important objects and additional advantages of the present invention will become more readily apparent from the ensuing description in conjunction with the accompanying drawings, wherein:

Fig. 3 is an elevation similar to that of Fig. 1 but seen from the opposite side of the welder;

Fig. 4 is an end view of the welder seen in the direction of arrows 4—4 indicated in Fig. 3;

Fig. 5 is an end view seen in the direction of arrows 5—5 of Fig. 3;

Fig. 12 is an enlarged cross section through the spring-loaded stop of the welder taken along line 12—12 of Fig. 3;

Fig. 13 is a partial section taken along line 13—13 of Fig. 3 through the work support of the stationary electrode;

Fig. 14 is a partial section taken approximately along line 14—14 of Fig. 3;

Fig. 15 is a partial sectional view taken along line 15—15 of Fig. 4;

Figures 1, 2, 11:
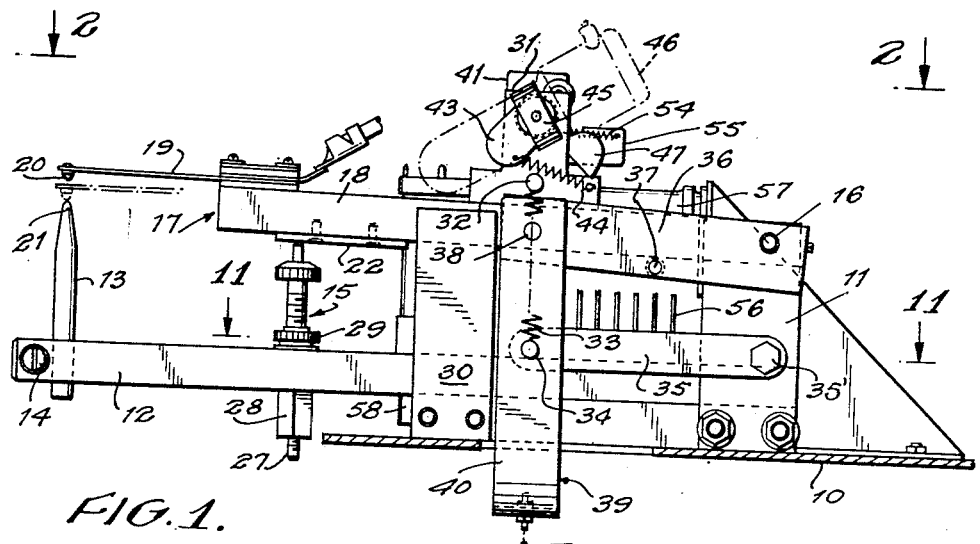
Fig. 1 represents a diagrammatical side elevation of an electric welder in accordance with the present invention.
Fig. 2 is a top view thereof.
Fig. 11 is a partial section taken along line 11—11 of Fig. 1.

The drawings of the present device are held in a more or less diagrammatical form and are primarily intended to facilitate the explanation of the different features of the device rather than its structure. The device is supported by a platform 10 which is intended to represent any suitable base upon which the device can be mounted. Extending from platform 10 is a supporting column 11 from which extends stationary electrode 12 beyond the edge of the platform. Electrode 12 preferably constitutes a fixed arm, at the end of which is adjustably mounted a work support 13, which latter is shown clamped between the split end of the electrode and held in position by means of bolt 14. In electrode 12 there is also adjustably mounted a spring-loaded stop 15, shown in greater detail in Fig. 12, the structure and function of which will be explained presently.

In supporting column 11 there is pivotally supported at 16 a mobile electrode 17, the latter being composed of a rigid portion 18 and a resilient portion 19 extending from the latter and comprising a cantilever spring, at the end of which is located the contact terminus 20 of the mobile electrode just opposite contact terminus 21 of work support 13, see Figs. 1 and 3. At the lower surface of rigid portion 18 of the mobile electrode there is provided an insulation plate 22 which serves as abutment for adjustable stop 15 and electrically separates the two electrodes.

Referring again to Fig. 12, it will be observed that in stationary electrode 12 is provided a threaded passage for the reception of an externally threaded tubular element 23 which terminates in a knurled head 24 through which projects a pin 25 supported by a spring 26, the latter's tension being adjustable by means of a set screw 27 projecting from bottom lock nut 28 for tubular element 23. In its locking position nut 28 bears against the bottom surface of electrode 12. Another lock nut 29 engages element 23 and bears in its locking position against the top surface of electrode 12.

The rigid portion 18 of electrode 17 operates within guides 30 to prevent any sidewise deflections of mobile electrode contact terminus 20 relative work support terminus 21 of the stationary electrode. Supported by rigid portion 18 of the mobile electrode is a block structure 31 from which extends a support pin 32 for spring 33, the lower end of which engages a pin 34 extending from lever 35 which is pivoted at 35' in the column 11.

As stated, mobile electrode 17 is pivoted at 16 in the column and on the same pivot are operatively mounted side guide arms 36 movable simultaneously with electrode 17, the rigid portion 18 of the electrode being supported by a connecting pin 37 passing through the guide arms 36, as clearly seen in Figs. 1, 2 and 14. At the free ends of the guide arms are mounted aligned, individual pins 38, see Figs. 1 and 6, with which are operatively associated the two legs of the electrode operating yoke 39. One of the yoke legs 40 is shorter than its other leg 41, which latter extends above block structure 31, as may be clearly observed from Fig. 6. Pin 34 for spring 33 passes from lever 35 through shorter leg 40 of electrode operating yoke 39. The yoke is intended for foot operation by a chain or other suitable means.

Figure 6:
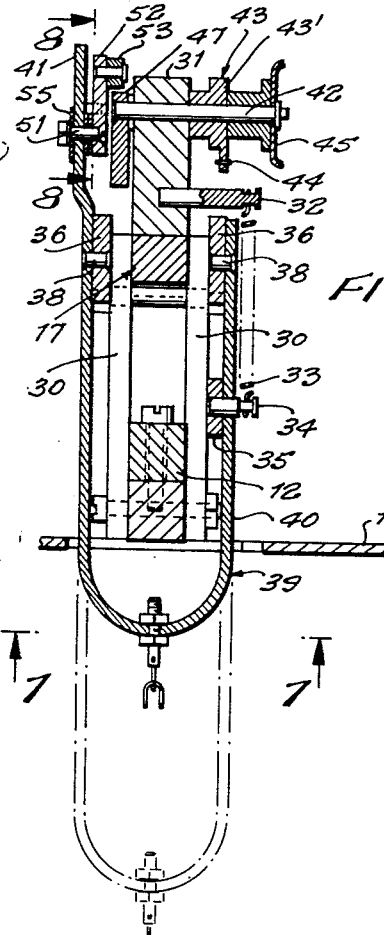
Fig. 6 is a section approximately along line 6—6 of Fig. 3 with the welder operating yoke shown in two positions.
Figure 9:
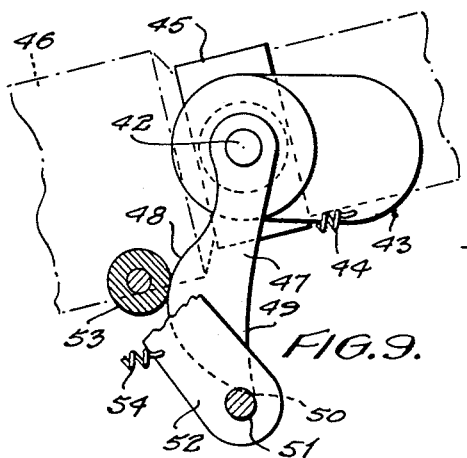
Fig. 9 is a similar enlarged partial detail view of the mechanism in an intermediate position.
Figure 10:
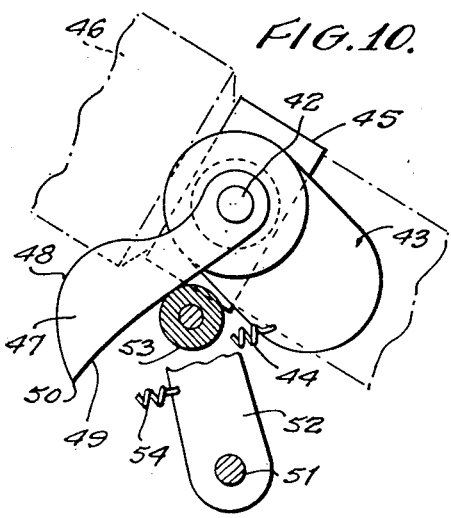
Fig. 10 is a similar enlarged detail view of the mechanism in still another position.
Figure 7:
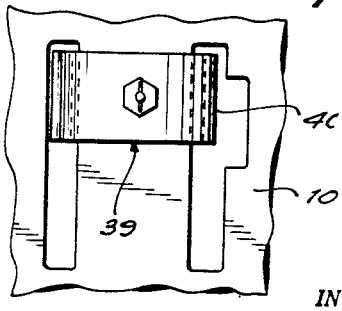
Fig. 7 is a bottom view of the yoke.

In block structure 31 there is pivotally lodged a pin 42 (see Fig. 6). Fixedly associated with that pin at the right of the figure is a lever element 43, shown in side view in Fig. 1 and in end view in Figs. 4 and 5 and partly in section in Fig. 15. From the enlarged hub portion 43' of the element extends a stop pin 43" for engagement with a corresponding stop pin 31' projecting from block structure 31, see Fig. 15. A spring 44 normally urges lever element 43 toward column 11. Also fixedly mounted at the right-hand end of pin 42 is a spring clip 45 for engaging and supporting a mercury switch 46. At the opposite or left end of pin 42 there is fixedly secured a cam 47 which is normally urged by spring 44 engaging lever element 43 to its normal position indicated in Fig. 8, whereby mercury switch 46 is held at its normal, circuit-breaking position. By consulting Figs. 8, 9 and 10 it will be observed that cam 47 has two distinct cam surfaces 48 and 49 which converge at a point 50.

Referring to Fig. 6, it will be seen that the upper end of longer yoke leg 41 is slightly offset to the left, and in that offset portion there is lodged a pin 51 about which pivots a traveling pawl 52 which is adapted to move with yoke 39 in downward and upward directions. At the free end of pawl 52 there is provided a roller 53 adapted for engagement with cam 47. A tension spring 54 supported by a plate 55, see Fig. 3, urges traveling pawl 52 to its normal position shown in Figs. 6 and 8. Mounted on support 10 is a half-wave rectifier 56, a resistor 57 and a condenser 58 which instrumentalities form parts of the discharge circuit for the welder.

In the four diagrams shown in Figs. 16 to 19, plugs 59 represent the sources of electric energy which may be of either direct or alternating current but being assumed, for the purpose of explaining the diagrams, as an alternating current source. Directly connected to plugs 59 are either adjustable transformers or potentiometers 60 provided with movable contacts 61 for varying the voltage required. Contacts 61 are connected with choke coils or resistances 62 and the latter are connected with half-wave rectifiers 63. Numerals 62 and 63 in the diagrams correspond to numerals 57 and 56 in Figs. 1 to 5.

Figure 16:
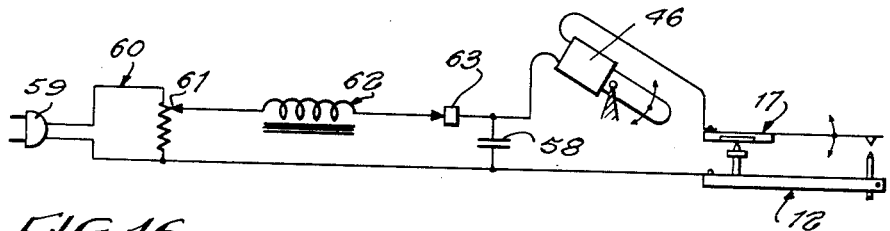
Fig. 16 is an electric diagram showing a discharge circuit with a single condenser as employed in the welder seen in Figs. 1 to 5.

The circuit diagram of Fig. 16 corresponds to the discharge circuit arrangement employed in the welder illustrated in Figs. 1 to 5, in which is also shown a single condenser 58, a mercury switch 46, a stationary electrode 12 and a mobile electrode 17.

Figure 17:
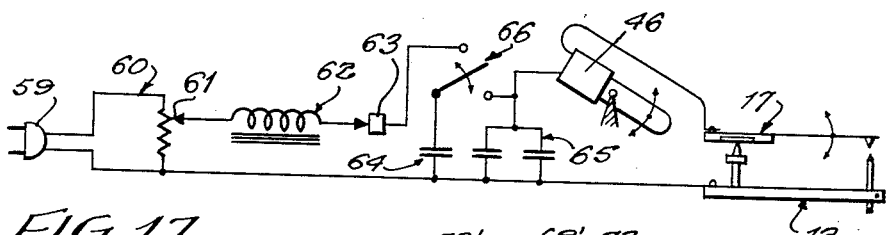
Fig. 17 is a similar diagram showing a discharge circuit employing two sets of condensers and auxiliary switch means.

The diagram in Fig. 17 essentially is the same as that of Fig. 16 except that instead of single condenser 58 there are shown a low capacity condenser 64 and twin condensers 65, the latter serving as a large capacity condenser. There will be also observed auxiliary switch means 66 which are adapted for first connecting condenser 64 with rectifier 63 to permit charging of the condenser at high voltage, whereupon the auxiliary switch means are thrown to connect condenser 64 with twin condensers 65 to distribute the charge through a larger capacity prior to being discharged through the contacting electrodes by way of mercury switch 46.

Figure 18:
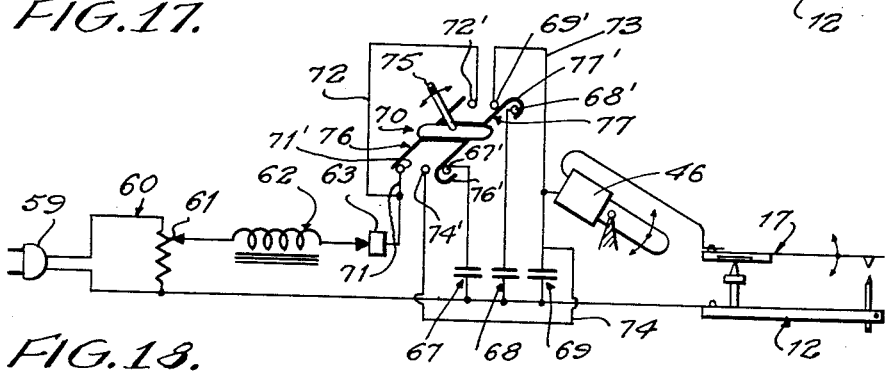
Fig. 18 is a diagram of the discharge circuit employing three different condensers and auxiliary switch means for alternately connecting them.

In the diagram disclosed in Fig. 18 there are employed three condensers 67, 68 and 69 and a modified auxiliary switch structure 70. Two leads 71 and 72 extend from rectifier 63 and terminate, respectively, in contact points 71' and 72'. From condenser 67 passes a lead to a contact point 67', and a similar contact point 68' forms the terminus of a lead from condenser 68, and another contact point 69' forms the terminus of lead 73 from condenser 69, and still another lead 74 from condenser 69 extends to contact point 74'. Auxiliary switch 70, which is of course shown in a most simple and purely diagrammatical form, comprises a dielectric connecting member 75 from which extend individual switch blade structures 76 and 77. Each of these blade structures have at least one curved terminus 76' and 77', respectively. In the position of the auxiliary switch shown, the rectifier is connected by lead 71 and its contact point 71' with switch blade structure 76, the latter engaging contact 67' at the end of the lead from condenser 67. At that switch position condenser 67 is being charged. At the same time switch blade structure 77 establishes connections between previously charged condenser 68 and condenser 69, which two condensers then serve in the same capacity as double condensers 65 shown in Fig. 17. In other words, the charge from condenser 68 is caused to be distributed over a larger capacity by the inclusion of condenser 69 prior to passing the charge by way of mercury switch 46 through the electrodes. When auxiliary switch stucture 70 is moved to the right, charged condenser 67 is connected with auxiliary condenser 69 to again distribute the charge over a larger capacity, while condenser 68 is being charged in that contact 72' from lead 72 extending from the rectifier is connected with switch blade structure 77, and the upper looped portion 77' of that switch structure will engage contact 68' of the lead from condenser 68. Obviously, contact point 69' is disconnected from the switch blade structure so that auxiliary condenser 69 becomes disconnected from condenser 68 during the time the latter is being charged.

Figure 19:
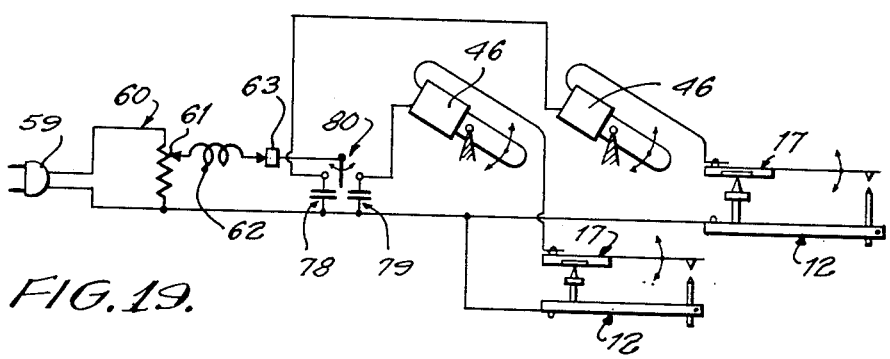
Fig. 19 is a diagram of the discharge circuit similar to that shown in Fig. 16, but in which two sets of electrodes are employed and two condensers, one for each electrode set, and auxiliary switch means for the condensers.

The diagram shown in Fig. 19 indicates the employment of two sets of welding electrodes in conjunction with two sets of mercury switches and two sets of condensers, indicated at 78 and 79, and the employment of an auxiliary switch device 80. The latter is adapted to connect either one of the condensers with rectifier 82 for alternately charging it. The procedure is such that while one of the condensers is being charged, the other is being discharged between one set of electrodes and while the discharged condenser is being charged, the charged condenser is discharging through the other set of electrodes. Thus time required for charging the condensers is being saved by the use of two welder sets.

*Operation of the welder*

The present device is particularly adapted to effect the delivery of electric energy of the required intensity through the interconnected electrode termini at the correct moment and for the correct duration, say at the very instant the electrodes become engaged with one another, and to immediately discontinue the current supply, even prior to the separation of the electrode termini. Such timing is essential for the production of uniform welds when like, relatively small articles are to be welded.

In order to achieve that purpose it is necessary to adjust stop 15 so that when yoke 39 moves in downward direction to actuate mobile electrode 17, the latter's rigid portion 18, normally supported by spring-loaded pin 25, will come to rest against head 24 of the stop. At that position resilient cantilever extension 19 of the electrode is brought under certain tension so that its contact terminus 20 positively engages the work piece resting upon terminus 21 of adjustable work support 13. The force of impact by contact terminus 20 upon the work piece during successive welding operations is maintained uniformly due to the fact that resilient extension 19 is placed under the same tension as it always travels the same distance in engaging a work piece of the same thickness. In other words extension 19 is never subjected to an over-strain. Therefore no matter how harshly or how lightly yoke 39 is operated to actuate electrode 17, by way of a pedal or other suitable means, the contact engagement of the work piece by the electrode termini always will be the same, irrespective of mechanical friction or stiffness of the electric leads by which the electrodes are connected.

Figure 8:
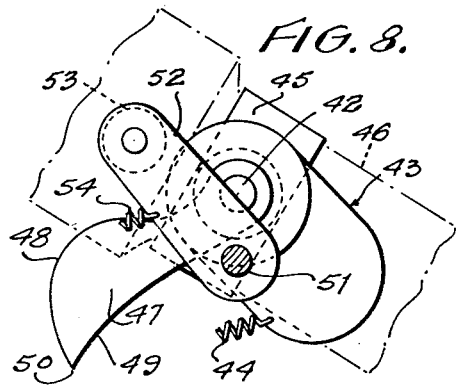
Fig. 8 is an enlarged fragmental detail view of the switch timing mechanism, partly in section, shown in its normal position and seen in the direction of arrows 8—8 indicated in Fig. 6.

For the purpose of properly timing the passage of current through the electrode termini there is employed mercury switch 46 and the required mechanism for operating the switch to close the circuit at the moment the work piece becomes forcibly held between the electrode termini, and to immediately break the circuit when the weld is made and prior to the release of the welded work piece by the electrode termini. That switch-operating mechanism consists of the previously described cam 47 and traveling pawl 52. The normal circuit-breaking position of switch 46 and the corresponding position of cam 47 is shown in Fig. 8. When yoke 39 is operated in downward direction, roller 53 of pawl 52 engages the doubly curved cam surface 48 and causes the cam to momentarily assume the position shown in Fig. 9 as roller 53 passes over the hump of cam surfaces 48. At that position of the cam, switch 46 assumes its circuit-closing position, thus causing an electric charge to pass through the work-piece held between the electrode termini.

As the pawl progresses in its downward movement, roller 53 approaches and finally passes the apex or converging point 50 of the two cam surfaces 48 and 49, thus releasing cam 47, the latter then reassuming its normal position, being brought to that position by the action of spring 44 engaging lever element 43 and urging it to turn in anticlockwise direction; consequently switch 46 also reassumes its normal, circuit-breaking position. As now yoke 39 is released to travel upward, roller 53 of pawl 52 will engage and travel over cam surface 49 and will roll over the hub of the cam as it reverts to its normal position, shown in Fig. 8, by the action of spring 54 supported in plate 55.

In order to hold cam 47 in its normal position, shown in Fig. 8, and against the tension of spring 44 engaging lever element 43, pin 43'', extending from the hub of that lever element, will arrest the latter's movement as it engages pin 31' projecting from block structure 31, see Fig. 15. The upward movement of operating yoke 39 is effected by spring 33 held under tension between pin 32, extending from block structure 31, and pin 34 projecting from pivoted lever 35.

The device shown in the drawings and described in the foregoing is primarily intended for the welding of like, relatively small and light-bodied parts. Obviously the present invention is not intended to be limited to just such specific application and its principle can be readily employed in welding large articles of any desired structural or physical properties different from those indicated herein, provided appropriate changes or modifications in the structure of the device are made to meet such requirements, such obvious changes or modifications being deemed to reside within the broad scope of the present invention, as defined in the annexed claims.

What is claimed as new is:

1. In an electric welder, a stationary, rigid electrode having as its terminus an adjustable work support, a mobile electrode movable relative to the stationary electrode and comprising a rigid portion and a resilient blade extension, the latter forming a flexible contact terminus of the mobile electrode and being adapted for cooperation with said work support, an adjustable spring-loaded stop for the rigid portion of the mobile electrode mounted in the stationary electrode, said stop being adapted to normally keep said contact terminus spaced from said work support; means for moving the mobile electrode toward the stationary electrode, thereby effecting a tensional engagement of the work support by the resilient extension; an electric power source, a transformerless discharge circuit, including a directly dischargeable capacitance, supplied by said source; an electric switch operative simultaneously with the mobile electrode and controlling the timing of the discharge of electric energy from said capacitance through the termini of the electrodes during their interengagement and prior to their separation, and switch actuating means for effecting the movement of the switch from its normal, circuit-opening to its circuit-closing position and back to its normal circuit-opening position.

2. In an electric welder as in claim 1, said switch actuating means comprising a spring-loaded cam operatively associated with the switch and being swingable with the latter about a joined pivot, said cam having two converging cam surfaces, a spring-loaded traveling pawl movable bodily relative to the cam body and adapted to successively engage first one and then the other cam surface during its travels first in one and then in an opposite direction as the mobile electrode is moved first toward and then away from the stationary electrode, whereby said cam is first swung from its normal position to a second, temporary position, and is kept in that position while the pawl progresses in that one direction over that one cam surface toward the converging point of the two cam surfaces, the pawl upon passing that converging point releasing the cam, the latter reassuming its normal position while the pawl commences its travel in that opposite direction, the pawl then engaging and moving along the other cam surface to its starting position in readiness for its next operating cycle.

3. In an electric welder as in claim 1, said capacitance comprising at least two condensers forming parts of said discharge circuit and being adapted to become alternately charged by said source and to be alternately discharged by way of said switch through the interengaged termini of the electrodes; and auxiliary switch means for facilitating the alternate charging of the condensers and their alternate discharge by way of said electric switch.

4. In an electric welder as in claim 1, said capacitance comprising at least two condensers of relatively low and relatively high capacities forming parts of said discharge circuit, auxiliary switch means for first connecting the low capacity condenser with the source for charging it and then with the high capacity condenser for discharging it thereinto prior to the passage of electric energy through the interengaged electrode termini by way of said electric switch.

5. In an electric welder as in claim 1, said capacitance comprising at least three condensers forming parts of said discharge circuit, and auxiliary switch means for facilitating an alternate charging of one condenser and the simultaneous discharge of two connected condensers by way of said electric switch through the interengaged electrode termini.

6. In an electric welder as in claim 1, said capacitance comprising at least three condensers forming parts of said discharge circuit, and auxiliary switch means for facilitating an alternate charging of one condenser and the simultaneous discharge of two connected condensers by way of said electric switch through the interengaged electrode termini, said auxiliary switch means being adapted to first connect one condenser with the source for charging it and then to connect the charged condenser with another condenser to distribute the charge over larger capacity prior to passing the charge through the interengaged electrode termini via said electric switch.

References Cited in the file of this patent

UNITED STATES PATENTS

| Number | Name | Date |
|---|---|---|
| 1,299,150 | Dyer | Apr. 1, 1919 |
| 1,489,093 | Mershon | Apr. 1, 1924 |
| 1,863,850 | Holloway | June 21, 1932 |
| 2,275,635 | Lindenblad | Mar. 10, 1942 |
| 2,319,385 | Calvert | May 18, 1943 |
| 2,413,391 | Usselman | Dec. 31, 1946 |
| 2,432,292 | Deal | Dec. 9, 1947 |
| 2,452,009 | Woodward | Oct. 19, 1948 |
| 2,454,338 | Pityo | Nov. 23, 1948 |
| 2,474,816 | Briggs | July 5, 1949 |
| 2,507,022 | Languepin | May 9, 1950 |
| 2,571,313 | Tucker | Oct. 16, 1951 |

FOREIGN PATENTS

| Number | Country | Date |
|---|---|---|
| 519,353 | Great Britain | Mar. 21, 1940 |